United States Patent [19]
Inoue et al.

[11] Patent Number: 5,923,631
[45] Date of Patent: Jul. 13, 1999

[54] OPTICAL INFORMATION RECORDING/ REPRODUCING APPARATUS INCLUDING A BEAM AXIS ADJUSTING DEVICE FOR ADJUSTING A POSITION OF A BEAM INCIDENT TO A DIFFRACTION GRATING

[75] Inventors: Masato Inoue; Kengo Emoto, both of Kawasaki, Japan

[73] Assignee: Canon Kabushiki Kaisha, Tokyo, Japan

[21] Appl. No.: 08/967,796

[22] Filed: Nov. 12, 1997

Related U.S. Application Data

[63] Continuation of application No. 08/707,717, Sep. 4, 1996, abandoned.

[30] Foreign Application Priority Data

Sep. 7, 1995 [JP] Japan .................................. 7-229941
Oct. 12, 1995 [JP] Japan .................................. 7-263905

[51] Int. Cl.⁶ .................................................. G11B 7/00
[52] U.S. Cl. ........................................ 369/109; 369/112
[58] Field of Search .......................... 369/44.23, 44.32, 369/44.37, 44.38, 100, 109, 112, 119

[56] References Cited

U.S. PATENT DOCUMENTS

| | | | |
|---|---|---|---|
| 5,065,380 | 11/1991 | Yokota | 369/109 X |
| 5,128,914 | 7/1992 | Kurata et al. | 369/44.37 |
| 5,373,492 | 12/1994 | Miyamoto et al. | 369/112 |
| 5,404,344 | 4/1995 | Imada et al. | 369/109 X |
| 5,444,224 | 8/1995 | Miyamoto . | |

FOREIGN PATENT DOCUMENTS 1-237940  9/1989  Japan .

*Primary Examiner*—Paul W. Huber
*Attorney, Agent, or Firm*—Fitzpatrick, Cella, Harper & Scinto

[57] ABSTRACT

In an optical information recording and/or reproducing apparatus, a light beam from an irradiation optical system is split into a plurality of beams by a diffraction grating. The plurality of light beams split by the diffraction grating are caused to irradiate an optical information recording medium. A light beam from the optical information recording medium is detected by a detection optical system. A beam axis adjusting mechanism is provided in an optical path between the irradiation optical system and the diffraction grating so as to adjust a position of a beam incident to the diffraction grating.

24 Claims, 15 Drawing Sheets

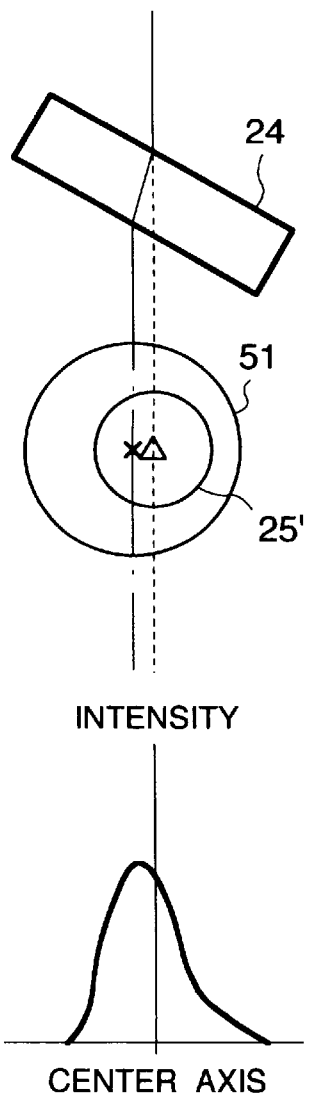
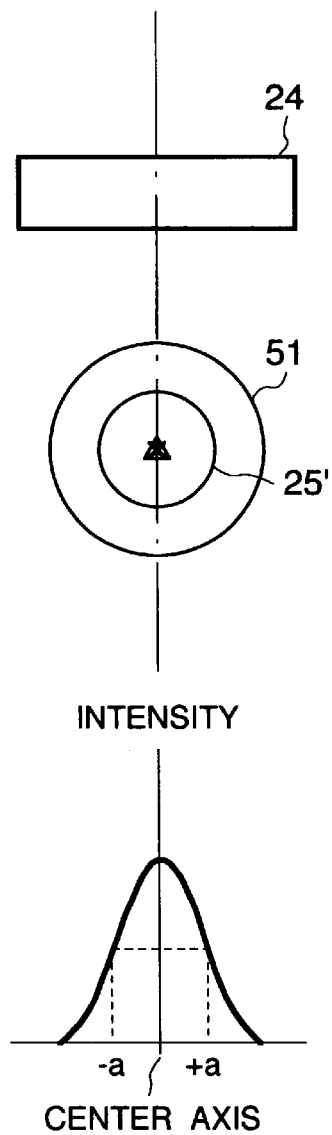
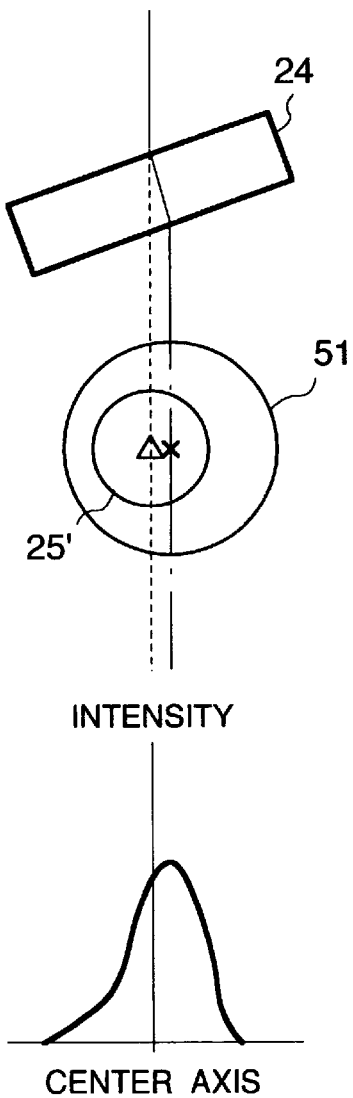

FIG.13A 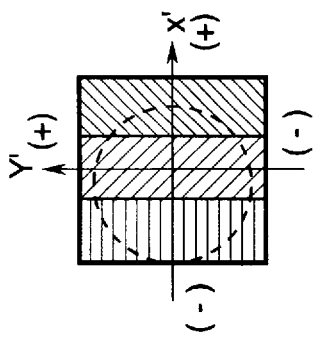 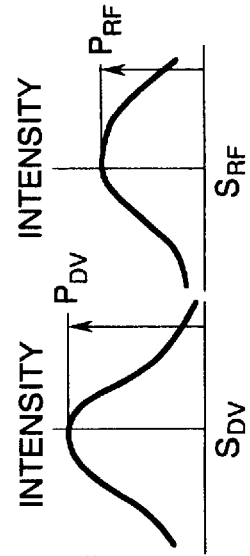
FIG.13B 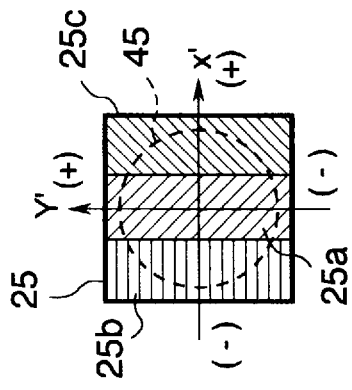 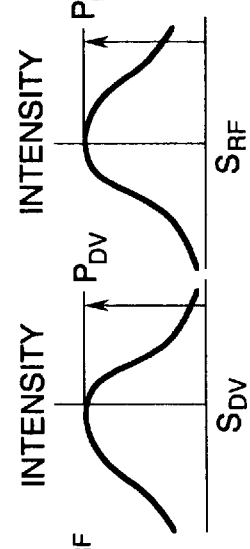
FIG.13C 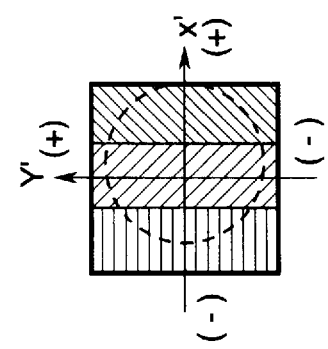 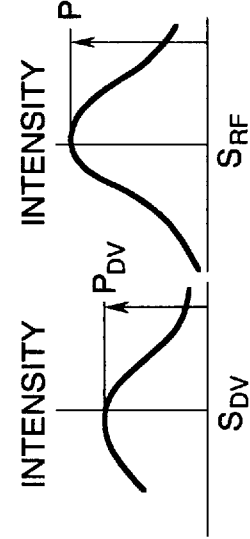

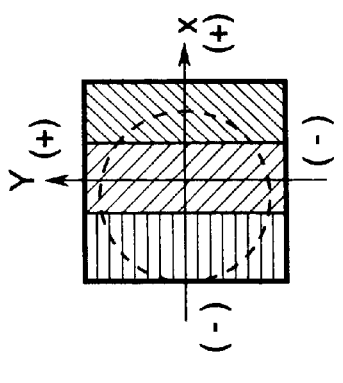
FIG.16A
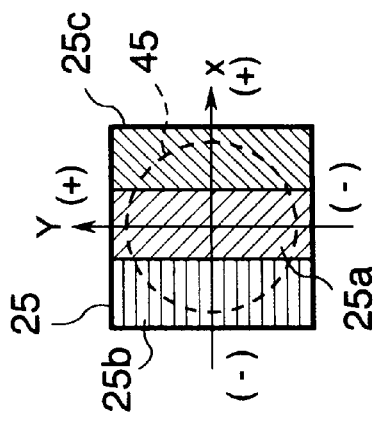
FIG.16B
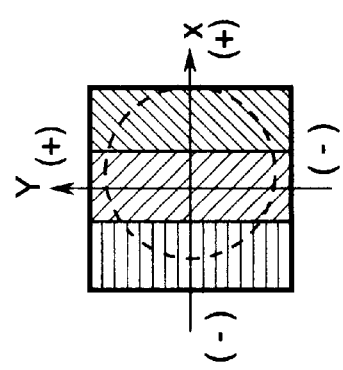
FIG.16C
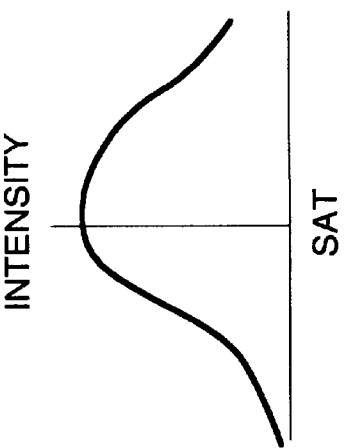
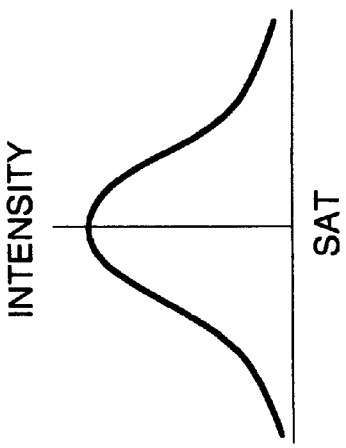
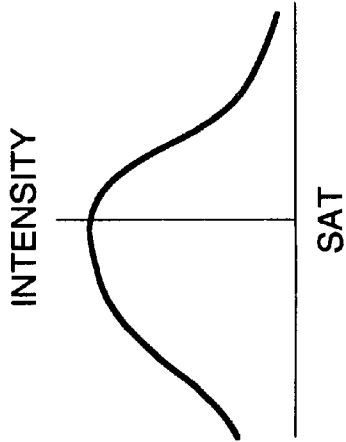

OPTICAL INFORMATION RECORDING/REPRODUCING APPARATUS INCLUDING A BEAM AXIS ADJUSTING DEVICE FOR ADJUSTING A POSITION OF A BEAM INCIDENT TO A DIFFRACTION GRATING

This application is a continuation of application Ser. No. 08/707,717, filed Sep. 4, 1996, now abandoned.

BACKGROUND OF THE INVENTION

1. Field of the Invention

The present invention relates to an optical information recording and/or reproducing apparatus for recording and/or reproducing information in such a way as to ra diate a plurality of beams onto an optical information recording medium having information tracks and tracking tracks and to receive reflected light therefrom by a photodetector.

2. Related Back ground Art

A variety of forms including a disk, a card, a tape, and so on are conventionally known for information recording media for recording and/or reproducing information with light. These optical information recording media include those capable of recording and reproducing information, those capable of only reproducing information, and so on. Information is recorded in a recordable medium in the form of an optically detectable information bit string while scanning an information track with an optical beam modulated according to recording information and focused in a micro spot.

The information is reproduced from the recording medium by scanning the information bit string in the information track by a light beam spot of constant power weak enough to avoid recording into the recording medium (or too weak to make the information bit string) and detecting reflected light or transmitted light from the recording medium.

An optical head used for recording and/or reproduction of information into or from the recording medium as discussed above is arranged to be movable relative to the recording medium in a direction of the information tracks and in a direction traversing the information track direction, and movement of the optical head causes the light beam spot to scan an information track. A focusing lens for focusing the light beam spot in the optical head is, for example, an objective lens. This objective lens is held on the optical head body so as to be movable independently in the axial direction (or in the focusing direction) and in the direction perpendicular to both the axial direction and the information track direction of the recording medium (or in the tracking direction). Such holding of the objective lens is normally effected through an elastic member, and the movement of the objective lens in the above two directions is usually effected by drive of an actuator utilizing magnetic interaction.

A card type recording medium (hereinafter referred to as an optical card) as shown in FIG. 1 is known as an optical information recording medium of this type. Here, many information tracks 2 are arranged parallel to the L-F direction on an information recording surface of the optical card 1. Also, a home position 3 to be a reference position in access to the above information tracks 2 is provided on the information recording surface of the optical card 1. The information tracks 2 are arranged, for example, in the order of reference symbols 2-1, 2-2, 2-3, ... from the side near the hom e position 3. Further, tracking tracks 4 are provided adjacent t o these information tracks in the order of reference symbols 4-1, 4-2, 4-3, ... , as shown in FIG. 2. These tracking tracks 4 function as a guide for autotracking (hereinafter referred to as AT) to control the beam spot so as not to depart from a predetermined information track during scanning of the light beam spot for recording or reproducing information.

This AT servo is carried out in such a way that, in the optical head, a deviation (AT error) of the above light beam spot from the information track is detected, a detection signal thereof is negatively fed back to the tracking actuator, and the objective lens is moved in the tracking direction (in the direction D) relative to the optical head body, whereby the light beam spot can be made to follow the desired information track.

In addition, autofocusing (hereinafter referred to as AF) servo is carried out in order to shape (or focus) the light beam in a spot of an appropriate size on the surface of the optical card during scanning of the information track with the light beam spot upon recording or reproduction of information. This AF servo is carried out in such a way that, in the optical head, a deviation (AF error) of the light beam spot from an in-focus state is detected, a detection signal thereof is negatively fed back to the focusing actuator, and the objective lens 28 is moved in the focusing direction relative to the optical head body, whereby the light beam spot can be focused on the surface of the optical card.

In FIG. 2, S1, S2, S3 represent light spots on the optical card, among which the light spots S1, S3 are used for the AT control and the light spot S2 for the AF control, production of information bits upon recording, and reading of information bits upon reproduction. In each information track, 6-1, 6-2 and 7-1, 7-2 indicate a pre-formatted left address portion and a right address portion, respectively, and an information track can be identified by reading this address portion. In the drawing, reference symbols 5-1 and 5-2 denote data portions (information bits).

In FIG. 3, numeral 21 designates a semiconductor laser as a light source, which emits, in this example, light having a wavelength of 830 nm polarized in the normal direction, onto the tracks. Numeral 22 designates a collimator lens, 23 a beam shaping prism, 25 a diffraction grating for splitting a light beam, 25' a diffraction grating portion, and 26 a polarizing beam splitter. Further, numeral 27 denotes a quarter wave plate, 28 an objective lens as a converging optical system, 29 a spherical lens, 30 a cylindrical lens, and 31 a photodetector. This photodetector 31 is composed of two light receiving elements 31a, 31c and a quartered light receiving element 31b, as shown in FIG. 4.

A light beam emitted from the semiconductor laser 21 is incident in the form of an elliptical divergent beam to the collimator lens 22. This lens collimates the light beam into a parallel beam, and the beam shaping prism 23 further shapes the parallel beam into a beam having a predetermined light intensity distribution, i.e., a circular intensity distribution (Gaussian distribution).

After that, the beam is incident to the diffraction grating 25, and the diffraction grating portion 25' having a smaller diameter than the diameter of the incident beam splits the incident beam into three light beams (the zeroth-order diffracted light and ± first-order diffracted light). These three beams are different in diameter for respective purposes. In this case, the zeroth-order diffracted light consists of diffracted light and non-diffracted light, and the beam diameter of the zeroth-order diffracted light is dominated by the beam diameter of the non-diffracted light. Naturally, the beam diameter of the zeroth-order diffracted light is larger than the beam diameter of the ± first-order diffracted light including only diffracted light. In the ordinary construction, beams of the zeroth-order diffracted light and ± first-order diffracted light are produced in the same beam diameter from the diffracted light and are used for the 3-beam AT method. The method for differentiating the beam diameter of the zeroth-order diffracted light from that of the ± first-order diffracted light, as described above, has been schemed out in order to realize higher accuracy of the AT control, to further enhance the recording density, or to raise the recording speed. The 3-beam AT method is based on such control as to keep a difference output zero between the output from the light receiving element 31a and the output from the light receiving element 31c. The three beams, thus split by the diffraction grating 25, are incident as beams of p-polarized light to the polarizing beam splitter 26.

Then, the three beams, as passing through the quarter wave plate 27, are converted into beams of circularly polarized light, and they are focused on the optical card 1 by the objective lens 28. The focused beams are three micro beam spots S1 (the + first-order diffracted light), S2 (the zeroth-order diffracted light), and S3 (the—first-order diffracted light), as shown in FIG. 2. Spot S2 is used for recording, reproduction, and AF control while spots S1 and S3 are used for AT control. Each spot is located on the optical card so that, as shown in FIG. 2, the light spots S1 and S3 are located on adjacent tracking tracks 4 while the light spot S2 is located on an information track 2 between the tracking tracks.

The reflected light from the light spots thus formed on the optical card 1 again passes through the objective lens 28 to be collimated, and the collimated beams pass through the quarter wave plate 27 to be converted into beams with the direction of polarization rotated 90° from that upon incidence. They are incident as beams of s-polarized light to the polarizing beam splitter 26 to be reflected and guided to a detection optical system.

The detection optical system has a combination of the spherical lens 29 with the cylindrical lens 30, and the AF control is carried out according to the astigmatic method with the combination. In the astigmatic AF method, such control is made as to keep a difference output zero between two sums of outputs from respective diagonal segments of the quartered light receiving element 31b in the photodetector 31.

The three beams reflected from the optical card 1 each are converged by the detection optical system to be incident to the photodetector 31 and to form three light spots thereon. The light receiving elements 31a, 31c receive the reflected light of the foregoing light spots S1, S3, and the AT control is carried out using a difference between outputs from these two light receiving elements. Further, the quartered light receiving element 31b receives the reflected light of the light spot S2, and the AF control is carried out using the outputs therefrom. In addition, reproduction of recording information is also carried out using the outputs from the light receiving element 31b.

When the whole optical system of the optical head as described above is moved relative to the recording medium, the light beam spot S2 can scan the information track.

If the optical head is of a separate type, as shown in FIG. 7, consisting of a fixed head 40 fixed to a part of the apparatus and a movable head 41 movable in directions along the optical axis extending from the fixed head (in directions along the arrow Y in the drawing) relative to the fixed head 40, the fixed head 40 consists of an irradiation optical system of from the light source 21 to the shaping prism 23 and the detection optical system of from the spherical lens 29 to the photodetector 31, while the movable head 41 consists of the diffraction grating 25 for diffracting a part of the beam from the irradiation optical system of the fixed head and the converging optical system of from the polarizing beam splitter 26 to the objective lens 28. The movable head translationally scans the beam from the fixed head 40 relative to the information track in the optical-axis directions (in the directions of arrow Y in the drawing), while the optical card 1 is moved in the directions of arrow X in the drawing, whereby the entire surface of the optical card can be scanned in order to record and reproduce information. In the drawing, reference numeral 43 denotes a photodetector for monitoring a quantity of emitted light and 44 a bending mirror for changing the direction of a beam.

The two conventional examples, however, had the following problems. Namely, it is very difficult in the two conventional examples to align the axial center of the beam from the light source 21 with the center of the diffraction grating portion 25' because of a positional adjustment error of the light source 21, a position error of the diffraction grating 25 in the direction perpendicular to the optical axis, or a fabrication error of the diffraction grating portion 25'. Especially, in the latter conventional example, when the moving direction of the movable head 41 has a relative inclination to the axis of the emergent beam from the irradiation optical system of the fixed head 40, the movement of the movable head 41 will shift the position of incidence of the light to the diffraction grating 25 disposed at the position of incidence of the light, within the surface thereof. This means that deviation occurs between the center of the diffraction grating portion 25' of the diffraction grating 25 and the center of the incident beam. Further, the two conventional examples have no specific means for aligning the centers with each other.

This failure in aligning the centers will result in a drawback that a light intensity distribution of each of the zeroth-order diffracted light and ± first-order diffracted light emerging from the diffraction grating 25 is not axially symmetric with respect to the center of a beam.

As shown in FIG. 5, the center axis 53 (the triangle in the drawing) of the diffraction grating portion 25' of the diffraction grating 25 is shifted from the center axis 52 (the cross in the drawing) of the incident beam 51 incident to the diffraction grating 25. In such a state, the light intensity distributions of the three diffracted light beams from the diffraction grating 25 are given as shown in FIGS. 6A and 6B. FIG. 6A shows the light intensity distribution of the ± first-order diffracted light while FIG. 6B shows the light intensity distribution of the zeroth-order diffracted light. As seen also from these light intensity distributions herein, they are asymmetric with respect to the center axis of each beam.

Two big problems occur when the symmetry of the light intensity distribution of the beam is lost. One of them is an AT offset. As shown in FIG. 2, the light spots S1 and S3 for AT each are positioned inside the track (though they may be located outside) with respect to the light spot S2 for AF and reproduction. Since the light spots S1 and S3 are the ± first-order diffracted light, they have the same light intensity distribution. They are incident onto the tracking tracks in the asymmetric light intensity distribution shown in FIG. 6A. When the AT control (the 3-beam AT method) is carried out so as to equalize the outputs from the light receiving elements 31a and 31c of the photodetector 31 shown in FIG. 4 or so as to keep the output difference zero between the outputs from the two light receiving elements, as described previously, an offset inevitably occurs, thus causing positional deviation of a recording information or degradation of reproduction signal.

The other problem is an AF offset. The AF control is a control to keep the difference zero between sums of diagonal segments of the quartered light receiving element 31b shown in FIG. 4 (in the astigmatic AF method). Position adjustment of the quartered light receiving element is carried out by moving the sensor lens system (the detection optical system) in the optical-axis direction so that the difference is kept zero between the sums of outputs from the diagonal segments, for the incident light having the asymmetric light intensity distribution of FIG. 6B. Since the light intensity distribution is originally asymmetric, a state of the difference being zero will result in locating the sensor lens system at a position shifted from the regular position of the sensor lens system.

As a result, a control signal for the astigmatic AF control, the so-called S-shaped signal, will lose a balance of its waveform, which makes AF easier to be off by internal or external vibration. This raises the problem that a stable recording and/or reproducing operation is not assured.

SUMMARY OF THE INVENTION

The present invention has been accomplished under the above circumstances, and an object of the present invention is to realize an optical information recording and/or reproducing apparatus that can align the center of a beam with the center of the diffraction grating portion of the diffraction grating so as to make the light intensity distributions of plural beams emergent from the diffraction grating axially symmetric with respect to the center of the beam, whereby the apparatus will have no AT offset so as to cause no positional deviation of recording information or no degradation of a reproduced signal and whereby the apparatus can record and/or reproduce information by stable AF control without AF failure due to vibration.

In order to achieve the above object, the present invention provides an optical information recording and/or reproducing apparatus in which in a path of a light beam from a light source there is provided a diffraction grating for diffracting a part of the light beam and in which a plurality of beams generated by the diffraction grating are converged by a converging optical system toward an information track and tracking tracks on a recording medium to form a plurality of light spots thereon, thereby recording and/or reproducing information into or from the recording medium, wherein beam axis adjusting means for adjusting a position of the light beam incident to the diffraction grating is placed in an optical path between the light source and the diffraction grating.

The present invention also provides another optical information recording and/or reproducing apparatus, which has an optical head comprised of a fixed head having an irradiation optical system including a light source and a detection optical system, and a movable head, movable relative to the fixed head, having a diffraction grating for diffracting a part of a light beam from the fixed head and a converging optical system and in which a plurality of beams generated by the diffraction grating are converged by the converging optical system toward an information track and tracking tracks on a recording medium to form a plurality of light spots thereon, thereby recording and/or reproducing information into or from the recording medium, wherein beam axis adjusting means for adjusting a position of the light beam incident to the diffraction grating is placed in an optical path between the irradiation optical system and the diffraction grating.

The foregoing can align the center of a beam with the center of the diffraction grating portion of the diffraction grating, whereby the light intensity distributions of the plural beams emerging from the diffraction grating become axially symmetric with respect to the center of the beam. Therefore, the apparatus has no AT offset so as to cause no positional deviation of recording information or no degradation of a reproduced signal and it can record and/or reproduce information by stable AF control without AF failure due to vibration or the like.

Another object of the present invention is to provide an optical information recording and/or reproducing apparatus provided with a diffraction grating element having a plurality of diffraction grating forming portions of different diffraction angles, which can be produced at relatively low cost, which can avoid an increase of the size of the optical head, and which has less deviation of the optical axis.

In order to achieve the above object, the present invention provides an optical information recording and/or reproducing apparatus in which a diffraction grating element having a plurality of diffraction grating forming portions is located in an optical path from a light source and in which a plurality of light beams separated thereby are converged by an objective lens into a plurality of light spots to irradiate an information track and tracking tracks on a surface of an optical information recording medium, thereby recording and/or reproducing information, which comprises a beam axis adjusting mechanism in an optical path between the light source and the diffraction grating element, and which is arranged in such a manner that a part of an incident beam is let to irradiate each diffraction grating forming portion of the diffraction grating optical element and that adjustment is effected using the beam axis adjusting mechanism so that a constant relation is established between diffracted light spots obtained from at least two diffraction grating forming portions out of the plurality of diffraction grating forming portions.

In the present invention, the constant relation stated above means a relation in which a ratio of peaks of sectional intensity distribution curves of the diffracted light spots obtained from at least two diffraction grating forming portions is coincident with a predetermined peak ratio. This relation may be such that the peaks of sectional intensity distribution curves of the diffracted light spots obtained from at least two diffraction grating forming portions are coincident with each other. Further, this relation may be such that a ratio of light quantities of the diffracted light spots obtained from at least two diffraction grating forming portions is coincident with a predetermined light quantity ratio or such that the light quantities of the diffracted light spots obtained from at least two diffraction grating forming portions are coincident with each other. Further, if necessary, the relation may be such that shapes of the diffracted light spots obtained from at least two diffraction grating forming portions are coincident with each other.

In order to achieve the above object, the present invention provides another optical information recording and/or reproducing apparatus in which a diffraction grating element having a plurality of diffraction grating forming portions is located in an optical path from a light source and in which a plurality of beams separated thereby are converged by an objective lens into a plurality of light spots to irradiate an information track and tracking tracks on a surface of an optical information recording medium, thereby recording and/or reproducing information, which has a beam axis adjusting mechanism in an optical path between the light source and the diffraction grating element, wherein a part of an incident beam is let to irradiate each diffraction grating forming portion of the diffraction grating element and wherein adjustment is effected using the beam axis adjusting mechanism so that a Y-axial and/or X-axial sectional intensity distribution curve of a diffracted light spot obtained from a diffraction grating forming portion shaped in axial symmetry with respect to the X-axis and/or the Y-axis crossing perpendicularly with the center being at an ideal optical axis point on the surface of the diffraction grating element can be in mirror symmetry with respect to the center being at a peak position thereof.

In this case, the diffracted light beam diffracted by the diffraction grating forming portion shaped in axial symmetry may be preferably an autotracking beam.

BRIEF DESCRIPTION OF THE DRAWINGS

FIGS. 9A, 9B, and 9C are drawings each to show inclination of a parallel-plate glass, the positional relation between the incident beam to the diffraction grating and the diffraction grating portion, and the sectional light intensity distribution of the ± first-order diffracted light;

FIGS. 13A, 13B, and 13C are drawings each to show the positional relation between the incident beam and the diffraction grating, and X-axis sectional intensity distribution curves of diffracted light spots diffracted by DV and RF diffraction grating forming portions at that time;

FIGS. 16A, 16B, and 16C are drawings each to show the positional relation between the incident beam and the diffraction grating and an X-axis sectional intensity distribution curve of the diffracted light spot diffracted by the AT diffraction grating forming portion.

DETAILED DESCRIPTION OF THE PREFERRED EMBODIMENTS

Figure 1:
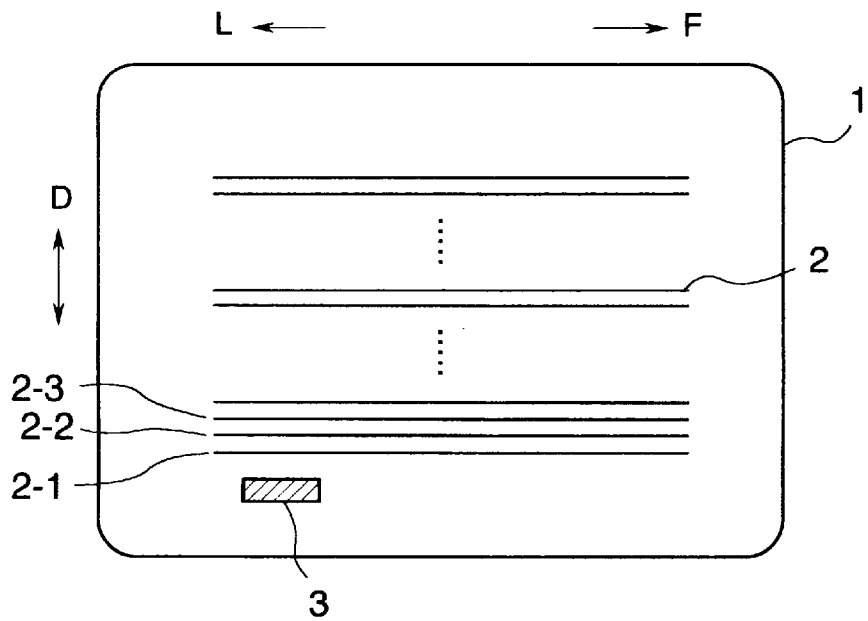
FIG. 1 is a schematic drawing of an optical card.
Figure 2:
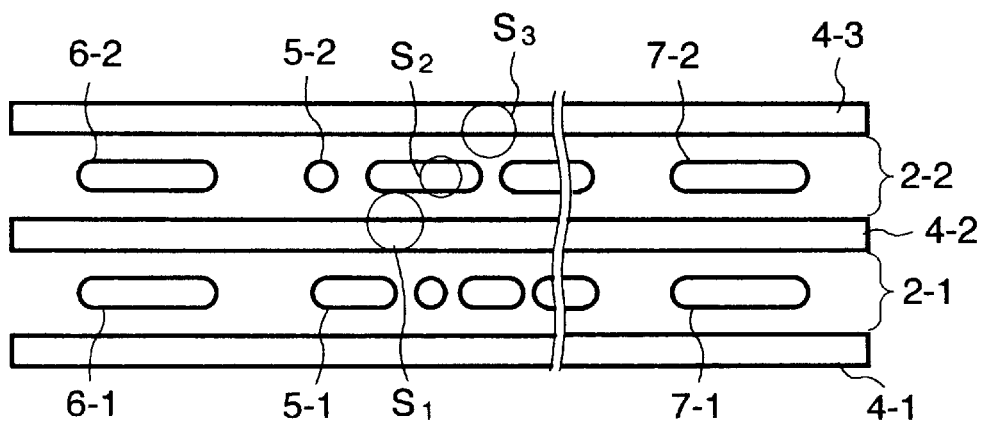
FIG. 2 is a partially enlarged view of the optical card to show the positional relation between the irradiation spots and tracks.
Figure 3:
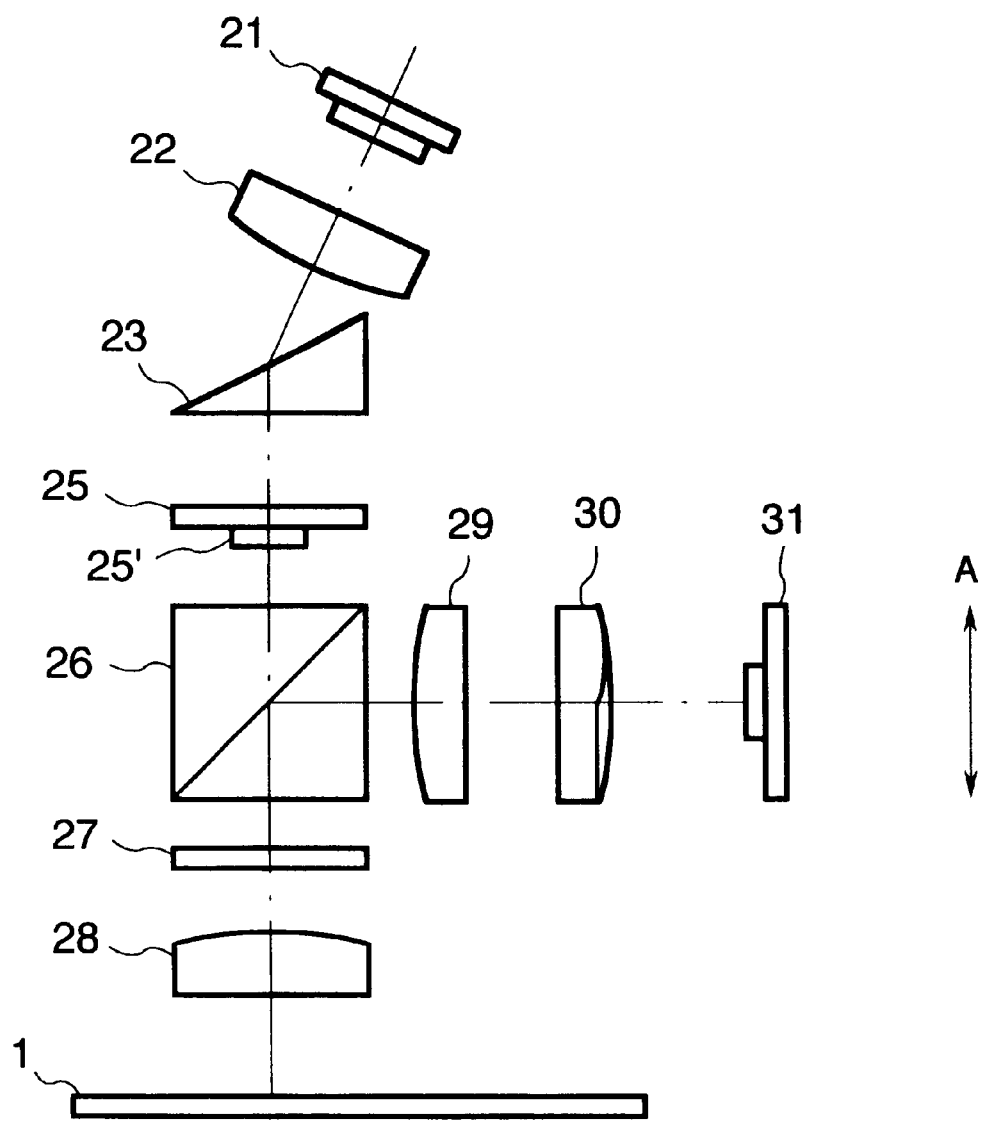
FIG. 3 is a schematic structural drawing of the optical system in a conventional optical information recording and/or reproducing apparatus.
Figure 4:
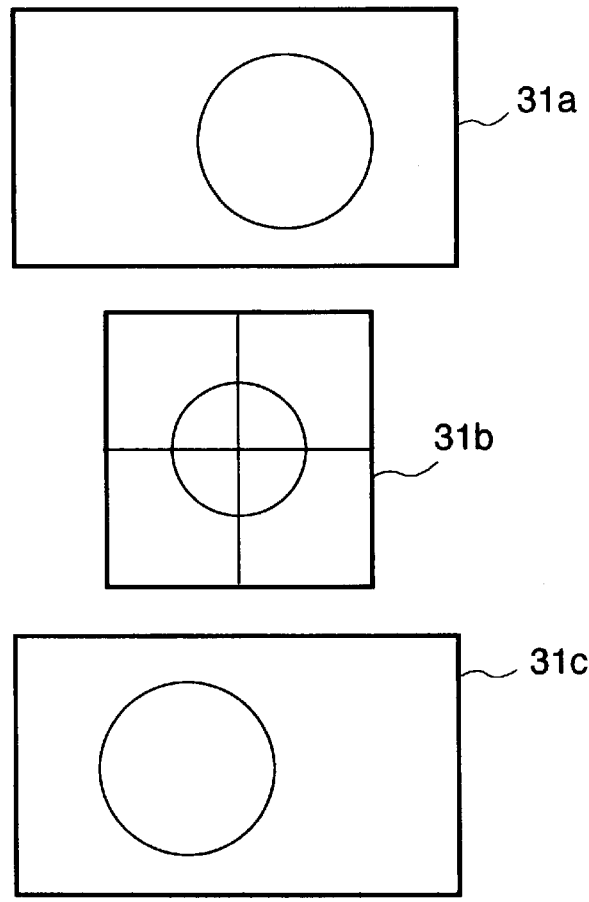
FIG. 4 is a drawing to show the positional relation between the construction of the photodetector and the light spots.
Figure 5:
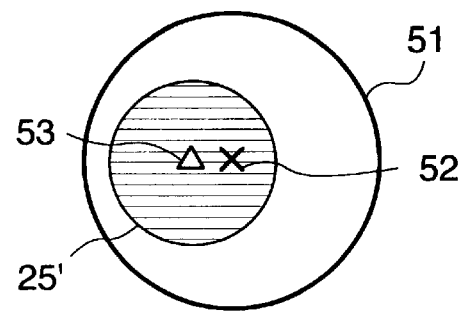
FIG. 5 is a drawing to show the positional relation between the incident beam to the diffraction grating and the diffraction grating portion in the conventional example.
Figure 6A:
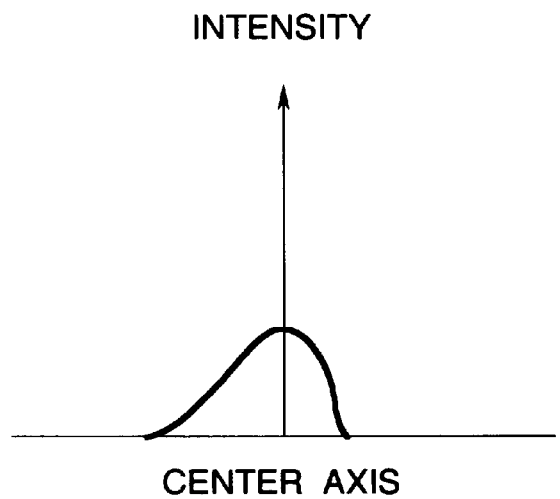
FIGS. 6A and 6B are drawings to show sectional light intensity distributions in the conventional example.
Figure 6B:
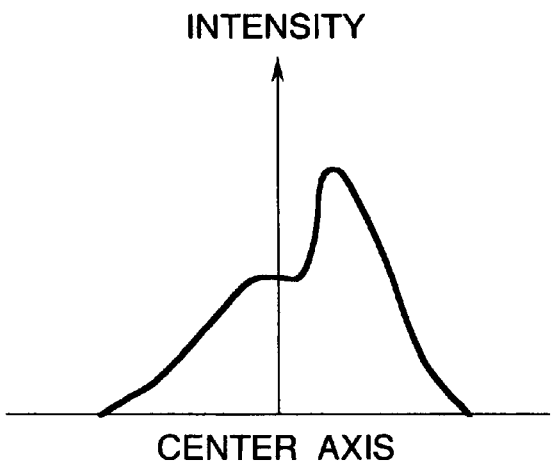

The first embodiment of the optical information recording and/or reproducing apparatus according to the present invention will be explained in detail with reference to FIG. 8 and FIGS. 9A to 9C. Constituents of the present embodiment common to the conventional example discussed previously (see FIG. 3) are denoted by the same reference numerals and a description of the construction and functions thereof is omitted herein. Here, a portion characteristic to the present invention is a parallel-plate glass 24 for parallel-shifting the optical axis of the beam from the light source 21, provided as an adjusting means for adjusting the position of the beam in the optical path between the light source 21 and the diffraction grating 25.

When the parallel-plate glass 24 is oriented at a certain angle relative to the optical axis of the beam from the light source 21, as illustrated, the beam incident to the parallel-plate glass 24 is shifted and emergent parallel to the axis thereof. An amount of an inclination angle of the parallel-plate glass 24 is determined so as to align the center axis of the beam incident to the diffraction grating portion 25' with the center of the diffraction grating portion 25' of the diffraction grating 25. The direction of inclination of the parallel-plate glass 24 can be selected from those of 360 degrees (all angle orientations) with respect to the axial center of the incident beam. Its adjustment can be effected by fixing the parallel-plate glass 24 at the position where the center axis of the beam is coincident with the center of the diffraction grating portion 25'.

FIGS. 9A, 9B, and 9C each show the positional relation between the beam 51 incident to the diffraction grating and the diffraction grating portion 25', and the sectional light intensity distribution including the peak intensity of the ± first-order diffracted light, in the case where the parallel-plate glass 24 is changed to be inclined relative to the axis of the beam. The views of the incident beam and diffraction grating portion 25' are those observed opposite thereto along the axial direction of the beam, and diagrams of the sectional light intensity distributions are intensity distributions of emergent beams from the diffraction grating 25, which are also intensity distributions of the AT light spots on the optical card.

As is apparent also from FIGS. 9A to 9C, when the inclination of the parallel-plate glass 24 is changed with respect to the axis of the beam from the light source 21, the center of the incident beam 51 (the cross in the drawing) shifts relative to the center (the triangle in the drawing) of the diffraction grating portion 25' of the diffraction grating 25. A preferred example of adjustment of the inclination of the parallel-plate glass 24 is to monitor the ± first-order diffracted light emerging from the objective lens 28 by a TV camera and to adjust the inclination as observing the sectional light intensity distribution at the position including the peak intensity, as being output from an image of the camera to a waveform monitor.

FIG. 9B shows an intensity distribution corresponding to an output wave from the waveform monitor when the centers are coincident with each other. The profile of the sectional light intensity distribution in this case is in mirror symmetry with respect to the peak intensity.

The adjustment may be carried out in such a manner that, for example, for the width at the half of the peak intensity of the waveform of the sectional light intensity distribution, i.e., for the half width, widths from the peak position, +a and −a in the drawing, satisfy the relation of $|+a|=|-a|$.

As a result, the light intensity distribution of the ± first-order diffracted light becomes axially symmetric with respect to the axis of the beam, so that no offset occurs in the AT control by the 3-beam AT method. Of course, there occurs no positional deviation of recording information or no degradation of a reproduction signal.

Since the zeroth-order diffracted light is also axially symmetric with respect to the axis of the beam, the positional deviation of the sensor lens system, as listed as a problem of the conventional example, can be avoided upon adjustment of the photodetector, no out balance appears in the so-called S-shaped signal being the AF control signal, the system becomes resistant to internal and external vibration, and AF failure rarely occurs.

Figure 10:
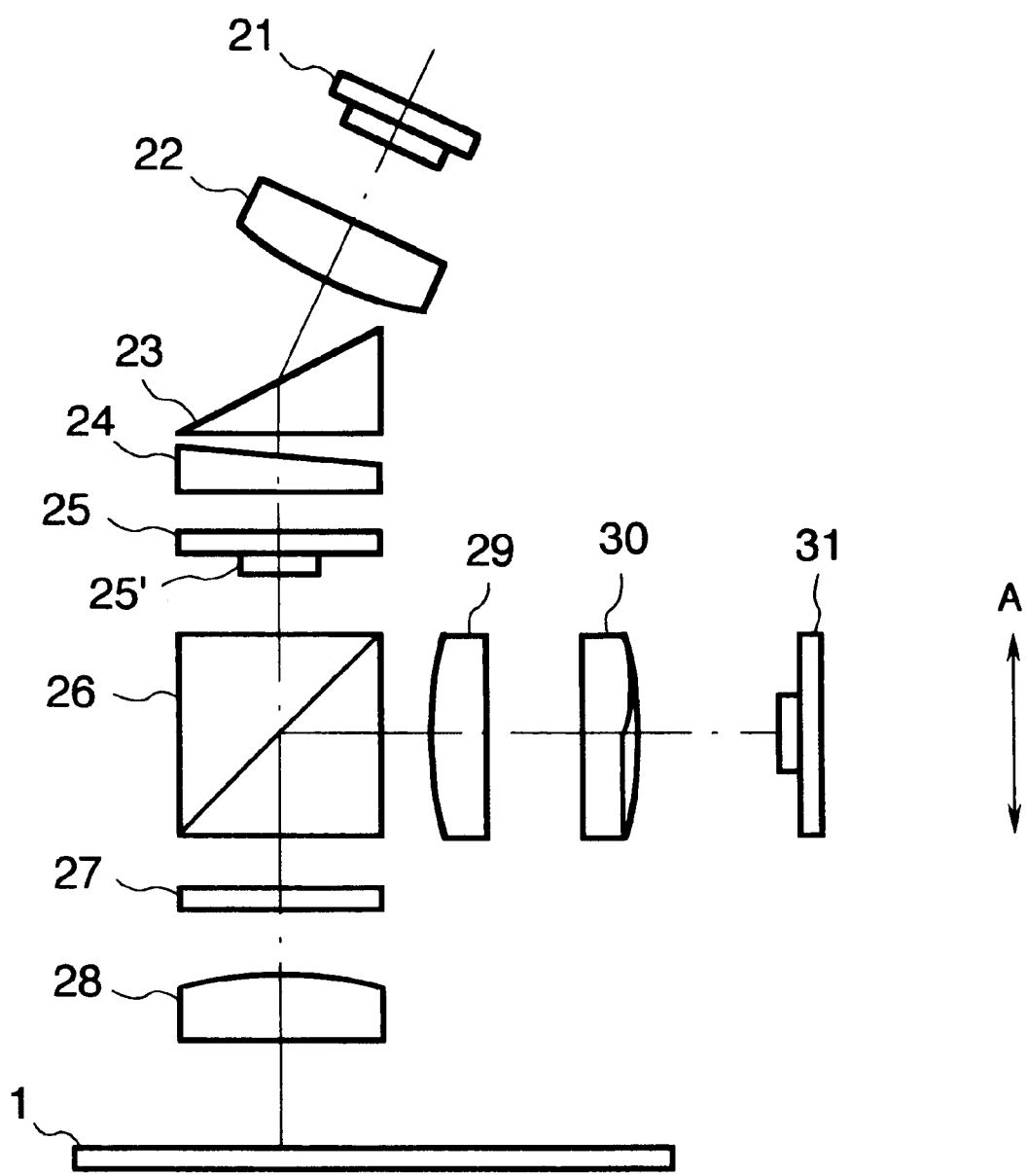
FIG. 10 is a schematic structural drawing of the optical system of the optical information recording and/or reproducing apparatus to show the second embodiment of the present invention.

The second embodiment of the present invention is next explained in detail with reference to FIG. 10. In this embodiment, the beam adjusting means is a wedge-shaped glass 24', and corrected for by rotating this wedge-shaped glass about the axis of a beam from the light source 21 or by inclining it in the same manner as the foregoing parallel-plate glass is in inclination or deviation of the axis of the beam generated by the light source 21 or inclination or deviation of the axis generated by the optical system up to the wedge-shaped glass 24', whereby the center of the diffraction grating portion 25' can be aligned with the center axis of the beam incident to the diffraction grating 25.

Here, a difference between the wedge-shaped glass and the parallel-plate glass resides in that the latter corrects the axial deviation of a beam while the former can also correct the inclination of a axis in addition to the axial deviation of the beam. The technique adopted in the foregoing embodiment can also be applied to the adjustment of rotation or inclination of the wedge-shaped glass. The resultant operational effect is also the same as in the case of the foregoing embodiment.

Figure 11:
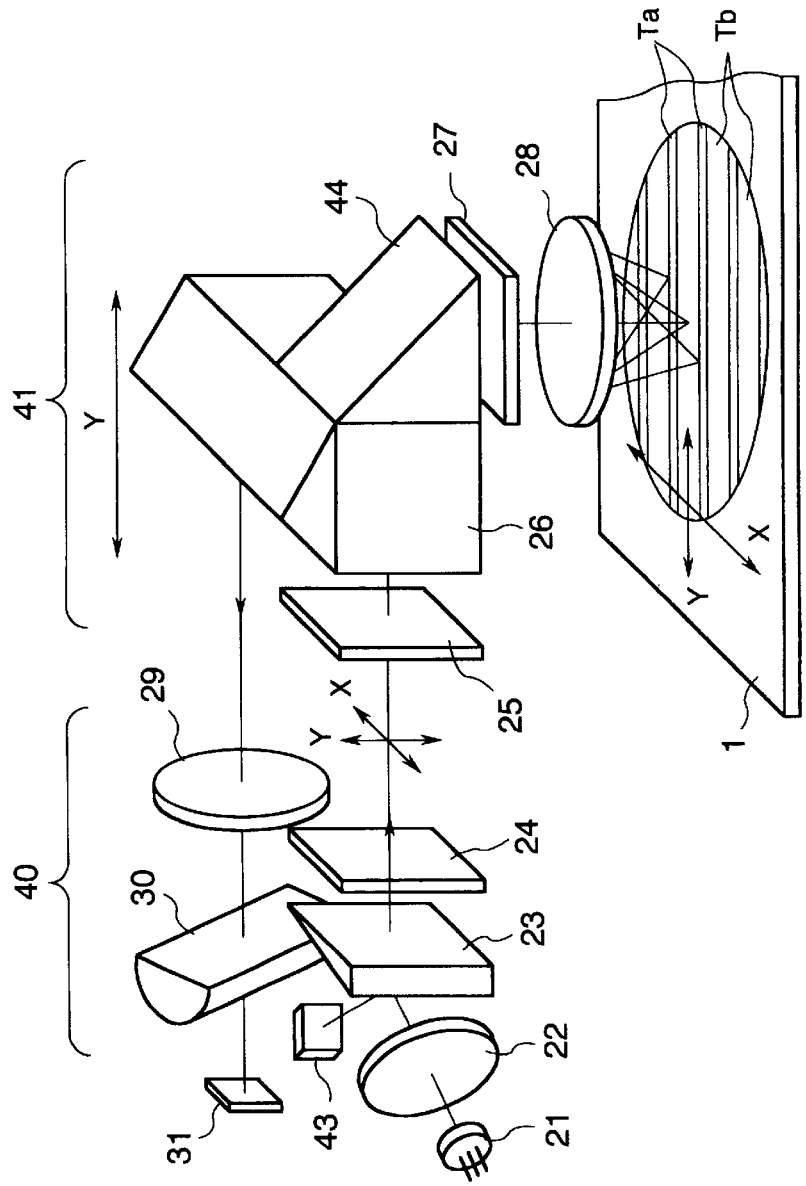
FIG. 11 is a schematic structural drawing of the optical system of the optical information recording and/or reproducing apparatus to show the third embodiment of the present invention.
Figure 12:
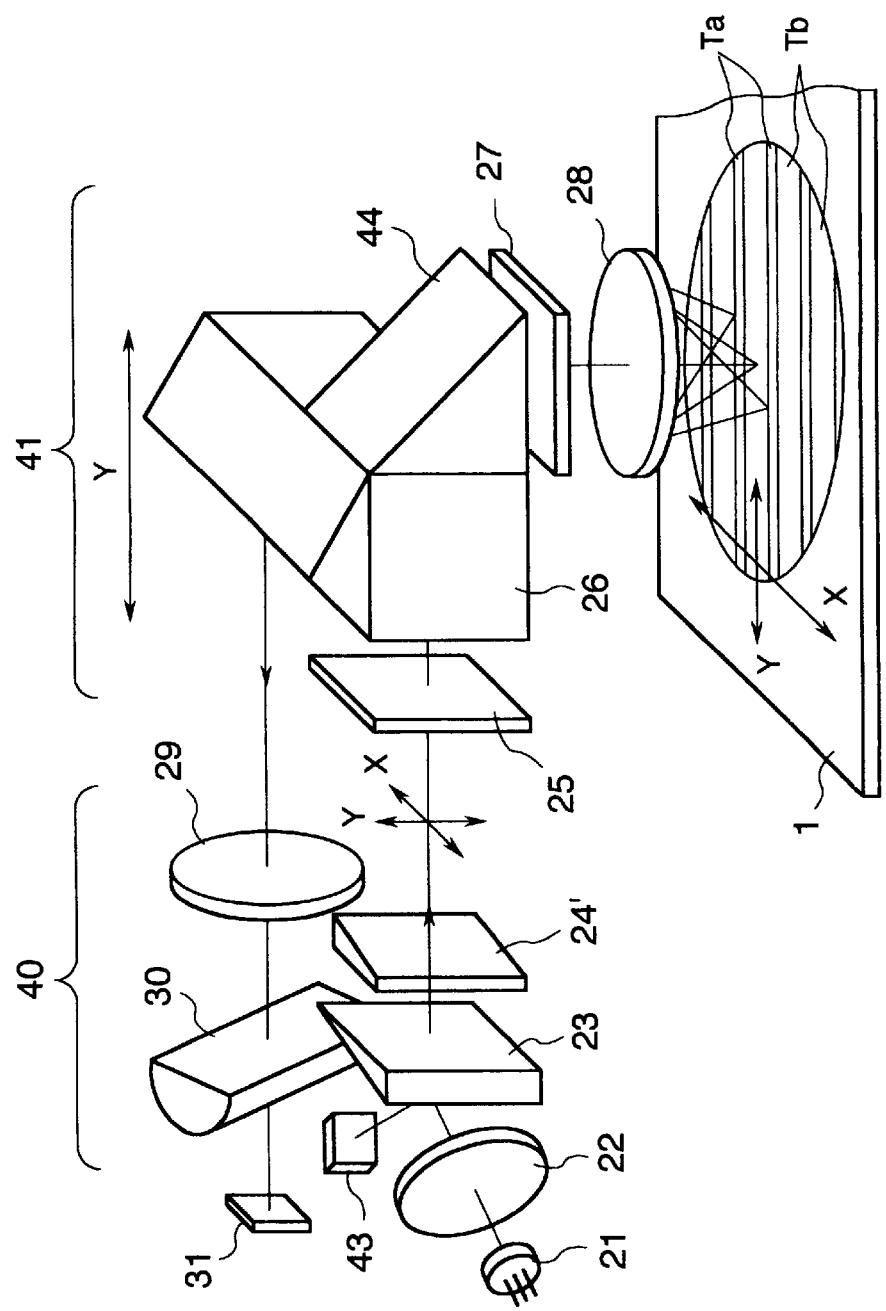
FIG. 12 is a schematic structural drawing of the optical system of the optical information recording and/or reproducing apparatus to show the fourth embodiment of the present invention.

FIG. 11 is a schematic structural drawing of the optical system of the optical information recording and/or reproducing apparatus in the third embodiment of the present invention and FIG. 12 is a schematic structural drawing of the optical system of the optical information recording and/or reproducing apparatus in the fourth embodiment of the present invention.

Figure 7:
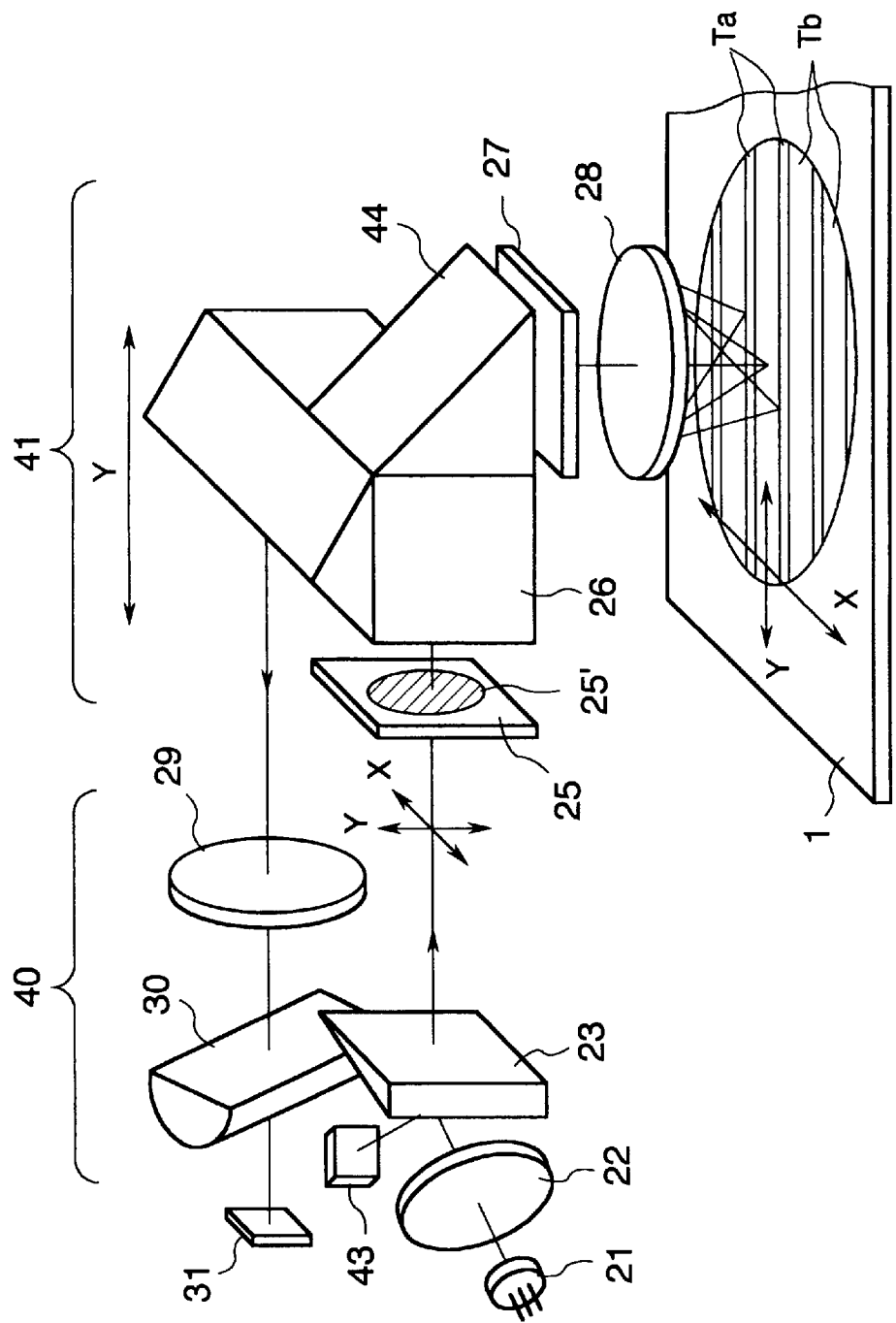
FIG. 7 is a schematic structural drawing of the optical system of the optical information recording and/or reproducing apparatus in another conventional example.
Figure 8:
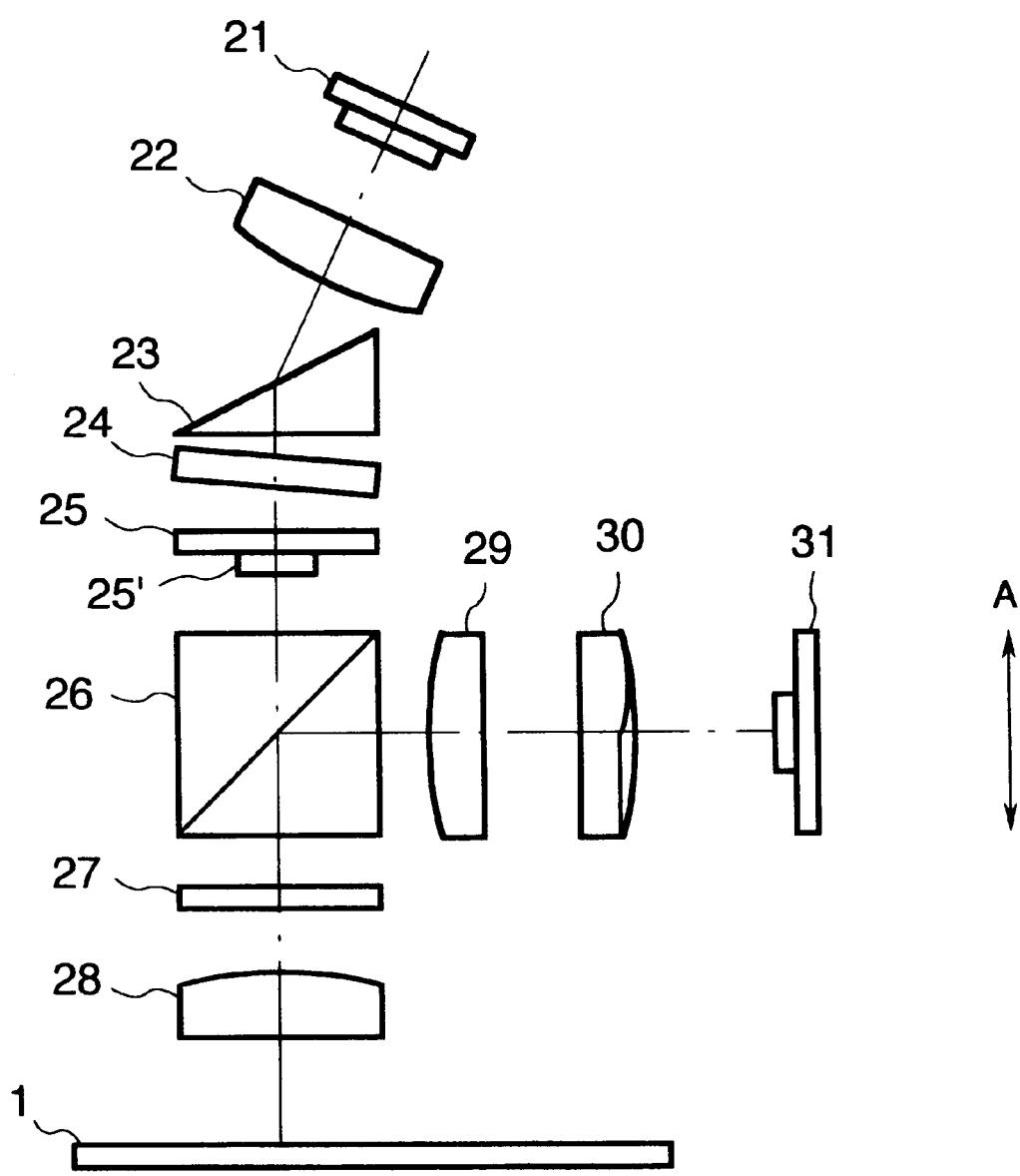
FIG. 8 is a schematic structural drawing of the optical system of the optical information recording and/or reproducing apparatus to show the first embodiment of the present invention.

Each of the embodiments shown in FIG. 11 and FIG. 12 adopts the optical head of the separate type consisting of the fixed head 40 and movable head 41 separate from each other, and the parallel-plate glass 24 (see FIG. 11) or the wedge-shaped glass 24' (see FIG. 12), as the beam adjusting means, is disposed in the optical path between the irradiation optical system of the fixed head 40 and the diffraction grating 25. The other structure is the same as in the conventional example (see FIG. 7) and the description of the construction and functions thereof is omitted herein.

As the foregoing embodiments can, each of these embodiments can align the center of a beam with the center of the diffraction grating portion of the diffraction grating, whereby the light intensity distributions of plural beams emerging from the diffraction grating are axially symmetric with respect to the center of the beam, thereby having no AT offset so as to cause no positional deviation of recording information or no degradation of a reproduction signal and permitting recording and/or reproduction by stable AF control without AF failure due to vibration.

The third embodiment of the present invention will be described in further detail with reference to the drawings. Here, in particular, reference numeral 25 designates a diffraction grating, and 24 a beam axis adjusting mechanism for adjusting the position of a beam so that the beam emitted from the semiconductor laser 21 may impinge at an appropriate position on the diffraction grating 25. The beam axis adjusting mechanism 24 is a parallel plate for correcting parallel shift in the X-direction.

FIGS. 13A to 13C are drawings to show the positional relation between the incident beam and the diffraction grating 25 and X-axis sectional intensity distribution curves of a diffracted light spot obtained from a DV diffraction portion (hereinafter referred to as "SDV") and a diffracted light spot obtained from an RF diffraction portion (hereinafter referred to as "SRF"). The X'- and Y'-directions in the drawings correspond to the X- and Y-directions, respectively, shown in FIG. 11 and will be called simply as "X" and "Y" in the following description.

The diffraction grating 25 shown in FIGS. 13A to 13C consists of a plurality of diffraction regions (25a, 25b, 25c) of different characteristics, formed without overlapping with each other, and the plurality of diffraction regions split the incident beam into a plurality of beams, which irradiate the recording medium.

In the embodiment shown in FIGS. 13A to 13C, different from the foregoing embodiments in which the diffraction grating portion smaller than the diameter of the incident beam diffracts a part of the incident beam, the beam axis adjusting means explained in the first and second embodiments is also used for the diffraction grating 25 composed of the plural diffraction grating portions 25a, 25b, 25c of different characteristics, as shown in FIGS. 13A to 13C. Thus, the same effect can be achieved as in the foregoing embodiments.

FIGS. 13A to 13C are the schematic drawings of the diffraction grating shown in FIG. 11, wherein reference numeral 25a designates a diffraction grating forming portion for AT (AT diffraction portion) for generating beams for AT control, 25b a diffraction grating forming portion for DV (DV diffraction portion) for generating beams for direct verification (DV), providing the ability to reproduce information immediately after being recorded, 25c a diffraction grating forming portion for RF (RF diffraction portion) for generating beams for information reproduction (RF) for reproducing information in information tracks adjacent to an information track irradiated by the recording light, and 45 an incident beam.

Figure 14:
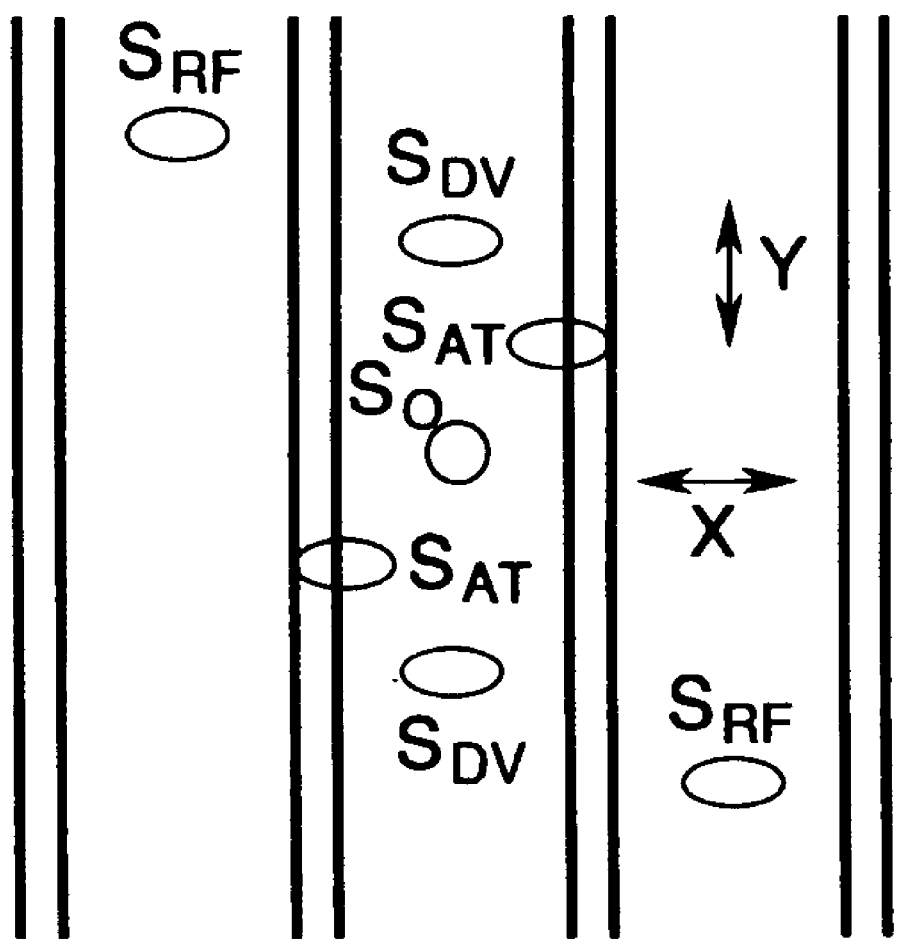
FIG. 14 is a drawing to show locations of light spots on the surface of the recording medium.

The diffracted beams and zeroth-order beam from the diffraction grating 25 form the light spots S0, SAT, SDV, SRF at appropriate positions on the optical card 1 through the objective lens 28, as shown in FIG. 14, which are used for translational recording and simultaneous reproduction of three tracks.

In FIGS. 13A to 13C, reference symbol 25a denotes the AT diffraction portion, 25b the DV diffraction portion, 25c the RF diffraction portion, and 45 the incident beam; the DV diffraction portion 25b and RF diffraction portion 25c have the same diffraction efficiency; when the optical axis of the incident light passes through the ideal optical axis point on the surface of the diffraction grating, i.e., in the case of FIG. 13B, beams incident to the respective DV diffraction portion and RF diffraction portion have the same shape and same light quantity. Accordingly, the diffracted light spots obtained from the DV diffraction portion and RF diffraction portion have the same sectional intensity distribution curve peak, the same light quantity, and the same light spot shape.

The operation is next explained referring to FIG. 11 and FIGS. 13A to 13C. The beam emitted from the semiconductor laser 21 is collimated by the collimator lens 22 and the collimated beam is incident to the shaping prism 23. Light reflected by the surface of the shaping prism 23 is projected onto the photodetector 43, while transmitted light is incident through the beam axis adjusting mechanism 24 to the diffraction grating 25 to be split into the zeroth-order beam and diffracted beams. The zeroth-order beam and diffracted beams generated by the diffraction grating 25 are further guided through the polarizing beam splitter 26, bending prism 44, quarter wave plate 27, and objective lens 28 to form the respective light spots.

When the optical axis of the beam incident to the diffraction grating 25 is shifted in parallel in the (+) direction on the X-axis from the ideal optical axis point, i.e., when the positional relation between the incident beam and the diffraction grating is as shown in FIG. 13A, the quantity of light incident to the RF diffraction portion 25c is greater than that of light incident to the DV diffraction portion 25b, and therefore, the sectional intensity distribution curve peak PRF of SRF becomes greater than PDV of SDV (PRF>PDV), as illustrated. Then, adjustment is carried out by inclining the parallel plate 24 for correcting the X-directional parallel shift, which is the beam axis adjusting mechanism, by an appropriate amount and in a correcting direction so that the peaks of the sectional intensity distribution curves of SRF and SDV may become equal to each other (PRF=PDV), as shown in FIG. 13B.

This adjustment makes the optical axis of the incident light pass through the ideal optical axis point on the surface of the diffraction grating. In this embodiment, when the peaks of the sectional intensity distribution curves are equal to each other, the sectional intensity distribution curves of SDV and SRF are in such a relation that they are coincident with each other when either one of the sectional intensity distribution curves is reversed left to right. Therefore, adjustment can be effected utilizing it.

On the other hand, in the case of the parallel shift in the (−) direction, the positional relation between the incident beam and the diffraction grating is as shown in FIG. 13C, and therefore, the peak PRF of the sectional intensity distribution curve of SRF is smaller than PDV of SDV (PRF<PDV). Then, adjustment is carried out by inclining the parallel plate 24 by an appropriate amount and, in the reverse direction, to that in the case of the foregoing parallel shift in the (+) direction.

In this embodiment, the diffraction efficiencies of the DV diffraction portion and RF diffraction portion are equal to each other and the beams incident to the respective portions of the DV diffraction portion and the RF diffraction portion have the same shape and same light quantity. Because of this, a peak ratio and a light quantity ratio of the sectional intensity distribution curves are 1:1, and therefore, the adjustment can be performed using these ratios. However, when the adjustment is carried out by equalizing the peaks of the sectional intensity distribution curves being absolute values, we can simultaneously know whether the peaks of the sectional intensity distribution curves are appropriate or not.

Although this example employs the adjustment by the peaks of sectional intensity distribution curves, the adjustment may be done utilizing the light quantity or the spot shape such as the spot diameter, which may be appropriately selected with necessity, taking into account necessary instruments for the adjustment, easiness of adjustment, or the like.

Figure 15:
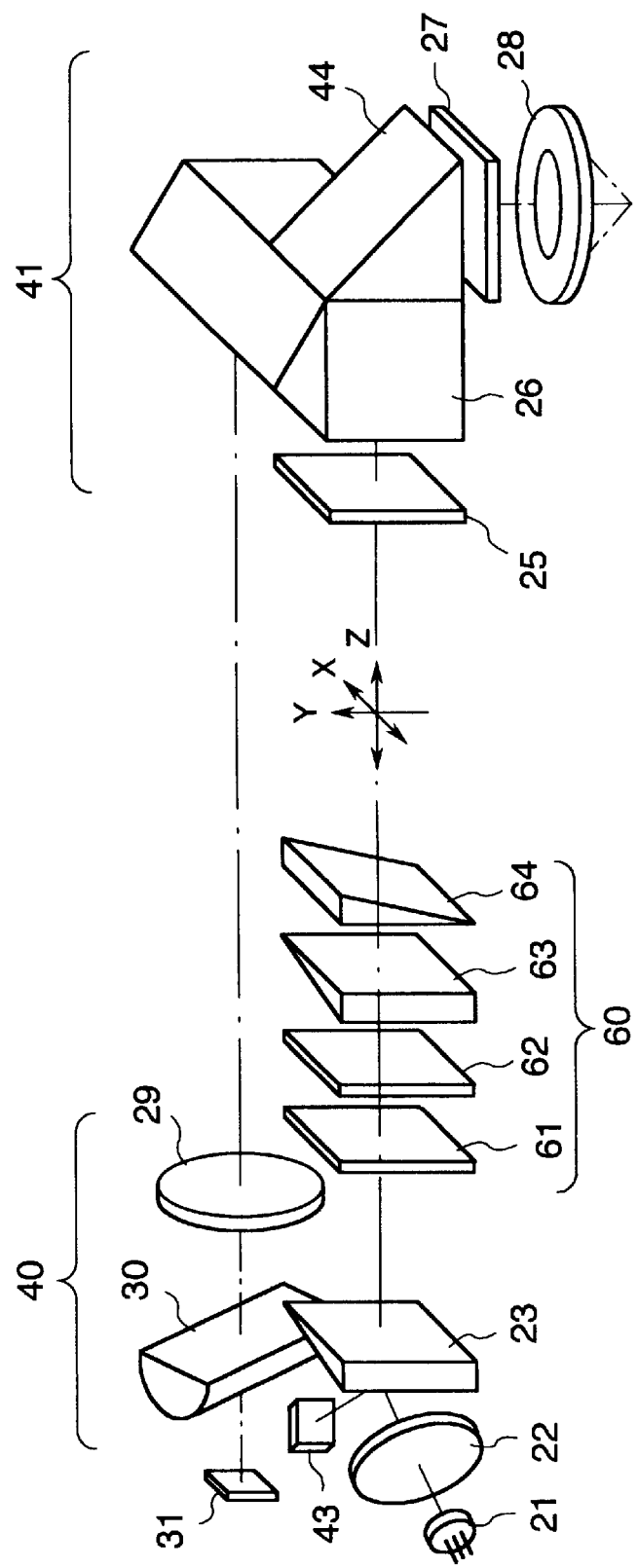
FIG. 15 is a schematic drawing to show the internal structure of a separate type optical head in the optical information recording and/or reproducing apparatus of the fifth embodiment according to the present invention.

The fifth embodiment of the present invention is next explained in detail with reference to the drawing. FIG. 15 is a perspective view to show the internal structure of the separate type optical head in the optical information recording and/or reproducing apparatus according to the present invention. Here, the same portions as those in FIG. 11 will be denoted by the same reference numerals and the description thereof is omitted. Reference numeral 41 denotes an optical head movable portion consisting of the diffraction grating 25, the polarizing beam splitter 26, the bending prism 44, the quarter wave plate 27, and the objective lens 28, numeral 60 denotes the beam axis adjusting mechanism for adjusting the beam emitted from the semiconductor laser 21 so as to be incident at an appropriate position on the diffraction grating 25, 61 a parallel plate for correcting parallel shift in the X-direction in the drawing, 62 a parallel plate for correcting parallel shift in the Y-direction in the drawing, 63 a wedge-shaped prism for correcting inclination in the X-direction in the drawing, and 64 a wedge-shaped prism for correcting inclination in the Y-direction in the drawing.

FIGS. 16A to 16C are drawings to show the positional relation between the incident beam and the diffraction grating and X'-axis sectional intensity distribution curves of a diffracted light spot SAT obtained through the objective lens after being diffracted by the AT diffraction grating forming portion having the shape axially symmetric with respect to the X'-axis and the Y'-axis crossing perpendicularly with the center being at the ideal optical axis point on the surface of the diffraction grating element at that time. In the drawings, the same portions as those shown in FIGS. 13A to 13C are denoted by the same reference numerals and the description thereof is omitted herein. The X'- and Y'-directions correspond to the X- and Y-directions, respectively, shown in FIG. 15, similarly as in the foregoing embodiments, which will be called simply as "X" and "Y."

The operation is next explained referring to FIG. 15 and FIGS. 16A to 16C. The beam emitted from the semiconductor laser 21 is collimated by the collimator lens 22 and the collimated beam is incident to the shaping prism 23. The light reflected by the surface of the shaping prism 23 is projected onto the photodetector 43 while the transmitted light is incident through the beam axis adjusting mechanism 60 to the diffraction grating 25 to be split into the zeroth-order beam and diffracted beams. The zeroth-order beam and diffracted beams generated by the diffraction grating 25 are further guided through the polarizing beam splitter 26, bending prism 44, quarter wave plate 27, and objective lens 28 to form respective light spots.

When the optical axis of the beam incident to the diffraction grating 25 is shifted in parallel in the (+) direction on the X-axis from the ideal optical axis point, i.e., when the positional relation between the incident beam and the diffraction grating is as shown in FIG. 16A, the X-axis sectional intensity distribution curve of the AT light spot SAT comes to have a gentler left-side curve than a right-side curve has with respect to the peak position, as illustrated, and becomes asymmetric with respect to the center at the peak position. Then, the adjustment is carried out by inclining the parallel plate 61 for correcting the X-directional parallel shift by an appropriate amount relative to the X-axis so that the X-axis sectional intensity distribution curve of SAT may become mirror-symmetric with respect to the center at the peak position, as shown in FIG. 16B. This makes the optical axis of the incident light pass through the ideal optical axis point on the surface of the diffraction grating.

In the case of the parallel shift in the (−) direction, the X-axis sectional intensity distribution curve of SAT has a gentler right-side curve than the left-side curve has with respect to the peak position, as shown in FIG. 16C, and thus, the adjustment is carried out so as to achieve the mirror symmetry with respect to the center at the peak position in the same operation as upon the parallel shift in the (+) direction. In the cases of parallel shift in the (±) directions on the Y-axis, the Y-axis sectional intensity distribution curve of SAT is also as shown in FIG. 16A or FIG. 16C, and the adjustment is carried out by inclining the parallel plate 62 for correcting the Y-directional parallel shift by an appropriate amount with respect to the Y-axis.

Figure 17:
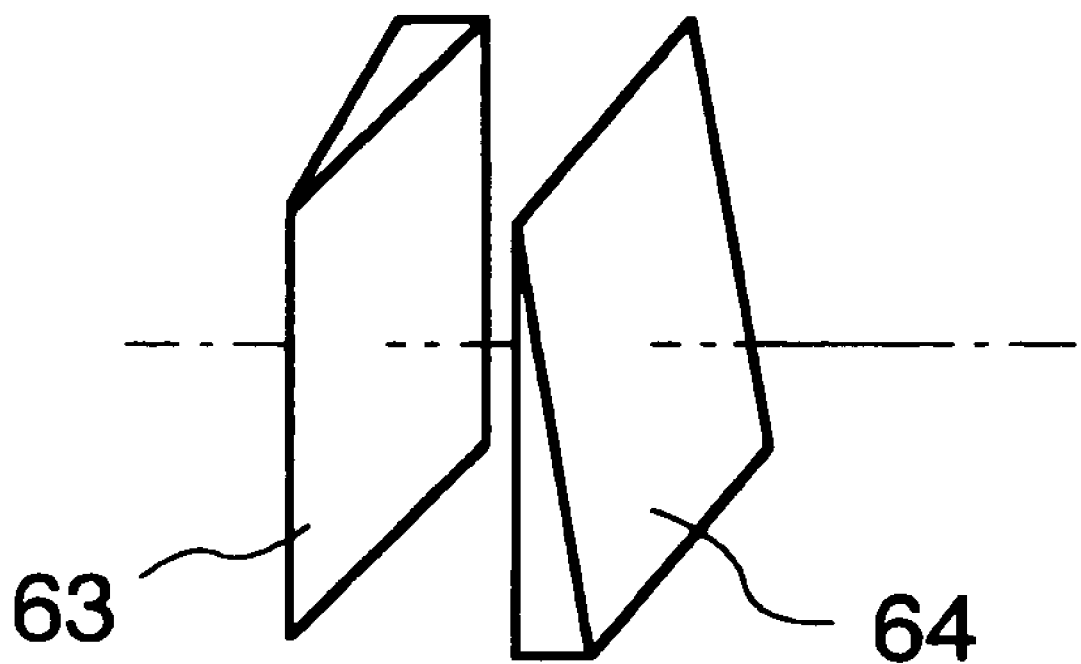
FIG. 17 is a drawing to show an arrangement, of wedge-shaped prisms.

Further, with inclination of the optical axis, when the movable portion 41 is moved in the direction of arrow Z in the drawing, optical-axis deviation or beam eclipse destroys the mirror symmetry with respect to the center at the peak position of the sectional intensity distribution curve of SAT. Thus, the adjustment is carried out by inclining the wedge-shaped prisms 63 and 64 with respect to the X-axis and the Y-axis, respectively, so as to correct it. The wedge-shaped prisms 63 and 64 can be positioned in the reversed orientations, as shown in FIG. 17, as reversed from those shown in FIG. 15.

As explained above, the present invention provides the optical information recording and/or reproducing apparatus in which, in the path of the beam from the light sources there is disposed a diffraction grating for diffracting a part of the beam and in which a plurality of beams generated by the diffraction grating are converged by the converging optical system toward the information track and tracking tracks on the recording medium to form a plurality of light spots thereon, thereby recording and/or reproducing information into or from the recording medium, wherein the beam axis adjusting means for adjusting the position of the beam incident to the diffraction grating is disposed in the optical path between the light source and the diffraction grating.

The present invention also provides the optical information recording and/or reproducing apparatus which has the optical head consisting of the fixed head having the irradiation optical system including the light source and the detection optical system, and the movable head, movable relative to the fixed head, having the diffraction grating for diffracting a part of the beam from the fixed head and the converging optical system and in which a plurality of beams generated by the diffraction grating are converged by the converging optical system toward the information track and tracking tracks on the recording medium to form a plurality of light spots thereon, thereby recording and/or reproducing information in or from the recording medium, wherein the beam axis adjusting means for adjusting the position of the beam incident to the diffraction grating is disposed in the optical path between the irradiation optical system and the diffraction grating.

Accordingly, the foregoing can align the center of the beam with the center of the diffraction grating portion of the diffraction grating whereby the light intensity distributions of the plural beams emerging from the diffraction grating become axially symmetric with respect to the center of the beam, thereby preventing the AT offset so as to cause no positional deviation of recording information or no degradation of a reproduction signal, and recording and/or reproducing information by stable AF control without AF failure due to vibration or the like.

As detailed above, the present invention can eliminate the optical-axis deviation of the beam incident to the diffraction grating, because the beam axis adjusting mechanism is used to effect such adjustment as to align the peaks of the sectional intensity distribution curves of the diffracted light spots obtained from the DV diffraction portion and RF diffraction portion. This achieves the effect to attain the structure capable of effecting stable recording and/or reproduction at relatively low cost and without optical-axis deviation while avoiding an increase of the size of the movable portion of the optical head.

Further, the present invention can suppress the optical-axis deviation of the beam incident to the diffraction grating, because the beam axis adjusting mechanism is used to effect such adjustment that the Y-axis or and/or X-axis sectional intensity distribution curve of the diffracted light spot diffracted by the AT diffraction grating forming portion having the axially symmetric shape with respect to the X-axis or and/or the Y-axis crossing perpendicularly with the center at the ideal optical axis point on the surface of the diffraction grating element may be mirror-symmetric with respect to the center at the peak position. This achieves the effect to obtain the structure capable of effecting stable recording and/or reproduction at relatively low cost and without optical-axis deviation while avoiding an increase of the size of the movable portion of the optical head.

What is claimed is:

1. An optical information recording and/or reproducing apparatus arranged to irradiate an optical information recording medium with a plurality of beams to record information in the optical information recording medium and/or reproduce the information recorded, said apparatus comprising:

an irradiation optical system;

a diffraction grating for splitting a light beam from said irradiation optical system into a plurality of beams, said diffraction grating having a plurality of diffraction grating forming portions, wherein the plurality of beams split by said diffraction grating are caused to irradiate the optical information recording medium;

a detection optical system for detecting a light beam from the optical information recording medium; and beam axis adjusting means, provided in an optical path between said irradiation optical system and said diffraction grating, for adjusting a position of a beam incident to said diffraction grating, wherein said beam axis adjusting means establishes a constant relation between diffracted light spots obtained from at least two diffraction grating forming portions out of said plurality of diffraction grating forming portions.

2. The optical information recording and/or reproducing apparatus according to claim 1, wherein said irradiation optical system comprises a light source.

3. The optical information recording and/or reproducing apparatus according to claim 1, wherein said diffraction grating is comprised of a plurality of diffraction areas having different characteristics, formed without overlapping with each other, and wherein the plurality of beams split by said plurality of diffraction areas are caused to irradiate the optical information recording medium.

4. The optical information recording and/or reproducing apparatus according to claim 1, wherein said beam axis adjusting means is a parallel-plate glass member.

5. The optical information recording and/or reproducing apparatus according to claim 1, wherein said beam axis adjusting means is a wedge-shaped glass member.

6. The optical information recording and/or reproducing apparatus according to claim 1, wherein said optical information recording and/or reproducing apparatus is comprised of a fixed head and a movable head, and wherein said irradiation optical system is disposed in said fixed head and said diffraction grating is disposed in said movable head.

7. The optical information recording and/or reproducing apparatus according to claim 6, wherein said beam axis adjusting means is disposed in said fixed head.

8. The optical information recording and/or reproducing apparatus according to claim 1, wherein the constant relation is a relation in which a ratio of peaks of sectional intensity distribution curves of the diffracted light spots obtained from said at least two diffraction grating forming portions is coincident with a predetermined peak ratio.

9. The optical information recording and/or reproducing apparatus according to claim 1, wherein the constant relation is a relation in which peaks of sectional intensity distribution curves of the diffracted light spots obtained from said at least two diffraction grating forming portions are coincident with each other.

10. The optical information recording and/or reproducing apparatus according to claim 1, wherein the constant relation is a relation in which a ratio of light quantities of the diffracted light spots obtained from said at least two diffraction grating forming portions is coincident with a predetermined light quantity ratio.

11. The optical information recording and/or reproducing apparatus according to claim 1, wherein the constant relation is a relation in which light quantities of the diffracted light spots obtained from said at least two diffraction grating forming portions are coincident with each other.

12. The optical information recording and/or reproducing apparatus according to claim 1, wherein the constant relation is a relation in which shapes of the diffracted light spots obtained from said at least two diffraction grating forming portions are coincident with each other.

13. An optical information recording and/or reproducing apparatus arranged to irradiate an optical information recording medium with a plurality of beams to record information in the optical information recording medium and/or reproduce the information recorded, said apparatus comprising:
   an irradiation optical system;
   a diffraction grating for splitting a light beam from said irradiation optical system into a plurality of beams, said diffraction grating having a diffraction grating portion smaller than a diameter of a light beam incident thereon, wherein the plurality of beams split by said diffraction grating are caused to irradiate the optical information recording medium;
   a detection optical system for detecting a light beam from the optical information recording medium; and
   beam axis adjusting means, provided in an optical path between said irradiation optical system and said diffraction grating, for adjusting a position of a beam incident to said diffraction grating, wherein said beam axis adjusting means causes a center axis of a light beam incident to said diffraction grating to be coincident with a center of said diffraction grating portion.

14. The optical information recording and/or reproducing apparatus according to claim 13, wherein said irradiation optical system comprises a light source.

15. The optical information recording and/or reproducing apparatus according to claim 13, wherein said beam axis adjusting means is a parallel-plate glass member.

16. The optical information recording and/or reproducing apparatus according to claim 13, wherein said beam axis adjusting means is a wedge-shaped glass member.

17. The optical information recording and/or reproducing apparatus according to claim 13, wherein said beam axis adjusting means causes the intensity distribution of a ± first-order diffracted light to be axially symmetric with respect to a center axis of a light beam incident on said diffraction grating.

18. An optical information recording and/or reproducing apparatus arranged to irradiate an optical information recording medium with a plurality of beams to record information in the optical information recording medium and/or reproduce the information recorded, said apparatus comprising:
   an irradiation optical system;
   a diffraction grating for splitting a light beam from said irradiation optical system into a plurality of beams, said diffraction grating having a plurality of diffraction grating forming portions, wherein the plurality of beams split by said diffraction grating are caused to irradiate the optical information recording medium;
   a detection optical system for detecting a light beam from the optical information recording medium; and
   beam axis adjusting means, provided in an optical path between said irradiation optical system and said diffraction grating, for adjusting a position of a beam incident to said diffraction grating, wherein said beam axis adjusting means causes the center of a light beam incident on said diffraction grating to be coincident with the center of one of the diffraction grating forming sections.

19. The optical information recording and/or reproducing apparatus according to claim 18, wherein said irradiation optical system comprises a light source.

20. The optical information recording and/or reproducing apparatus according to claim 18, wherein said diffraction grating is comprised of a plurality of diffraction areas having different characteristics, formed without overlapping with each other, and wherein the plurality of beams split by the plurality of diffraction areas are caused to irradiate the optical information recording medium.

21. The optical information recording and/or reproducing apparatus according to claim 18, wherein said beam axis adjusting means is a parallel-plate glass member.

22. The optical information recording and/or reproducing apparatus according to claim 18, wherein said beam axis adjusting means is a wedge-shaped glass member.

23. The optical information recording and/or reproducing apparatus according to claim 18, wherein said optical information recording and/or reproducing apparatus is comprised of a fixed head and a movable head, wherein said irradiation optical system is disposed in said fixed head and said diffraction grating is disposed in said movable head.

24. The optical information recording and/or reproducing apparatus according to claim 23, wherein said beam axis adjusting means is disposed in said fixed head.

* * * * *

UNITED STATES PATENT AND TRADEMARK OFFICE
CERTIFICATE OF CORRECTION

PATENT NO. : 5,923,631

DATED : July 13, 1999

INVENTOR(S): MASATO INOUE, ET AL.

It is certified that error appears in the above-identified patent and that said Letters Patent is hereby corrected as shown below:

COLUMN 1,
Line 14, "ra diate" should read --radiate--;
Line 18, "Back ground" should read --Background--; and
Line 65, "hom e" should read --home--.

COLUMN 8,
Line 8, "arrangement,of" should read --arrangement of--; and
Line 29, "emergent" should read --emerges-.

COLUMN 9,
Line 39, "a" should read --the--.

COLUMN 13,
Line 33, "sources" should read --source,--.

UNITED STATES PATENT AND TRADEMARK OFFICE
CERTIFICATE OF CORRECTION

PATENT NO. : 5,923,631

DATED : July 13, 1999

INVENTOR(S): MASATO INOUE, ET AL.

It is certified that error appears in the above-identified patent and that said Letters Patent is hereby corrected as shown below:

COLUMN 14,
Line 18, "or" should be deleted; and
Line 21, "or" should be deleted.

Signed and Sealed this

Eleventh Day of April, 2000

Attest:

Q. TODD DICKINSON

Attesting Officer

Director of Patents and Trademarks